United States Patent [19]
Peck et al.

[11] Patent Number: 5,526,098
[45] Date of Patent: Jun. 11, 1996

[54] COPIER MACHINE BOOK SUPPORT STRUCTURE

[75] Inventors: Walter D. Peck, Tigard, Oreg.; Mark West, Tehachapi, Calif.

[73] Assignee: Book Support Systems, Inc., Tigard, Oreg.

[21] Appl. No.: 513,003

[22] Filed: Aug. 9, 1995

[51] Int. Cl.$^6$ ............................................. G03G 15/00
[52] U.S. Cl. ........................................ 355/230; 355/75
[58] Field of Search ............................ 355/230, 25, 75; 248/445; D18/40, 41, 45; 358/497

[56] References Cited

U.S. PATENT DOCUMENTS

| | | | |
|---|---|---|---|
| D. 353,830 | 12/1994 | Peck | D18/41 |
| D. 353,831 | 12/1994 | Peck | D18/40 |
| 3,807,856 | 4/1974 | Rodriguez | 355/25 X |
| 5,053,819 | 10/1991 | Malyon et al. | 355/230 |
| 5,072,252 | 12/1991 | Howseman, Jr. | 355/25 X |

*Primary Examiner*—Joan H. Pendegrass
*Assistant Examiner*—Sophia S. Chen
*Attorney, Agent, or Firm*—Salter & Michaelson

[57] ABSTRACT

A book support structure for a copier machine includes a top wall constructed and arranged for receiving and supporting a sheet of glass. A first sloping side wall has an edge integrally formed with a first edge of the top wall and extends downwardly and outwardly at an angle from the top wall. A second sloping side wall has an edge integrally formed with a second edge of the top wall and extends downwardly and outwardly at an angle from the top wall and in a direction perpendicular to the direction of the first side wall. The arrangement is such that the book support structure enables a person to copy a page of a book having a spine in one of two separate orientations, the first orientation being achieved by placing the spine of the book along the junction of the edge of the first side wall and the first edge of the top wall and a page of the book to be copied over the sheet of glass, and the second orientation being achieved by placing the spine of the book along the junction of the edge of the second side wall and the second edge of the top wall and a page of the book to be copied over the sheet of glass. A retrofit kit for mounting the book support structure on an existing copier machine is further disclosed.

12 Claims, 6 Drawing Sheets

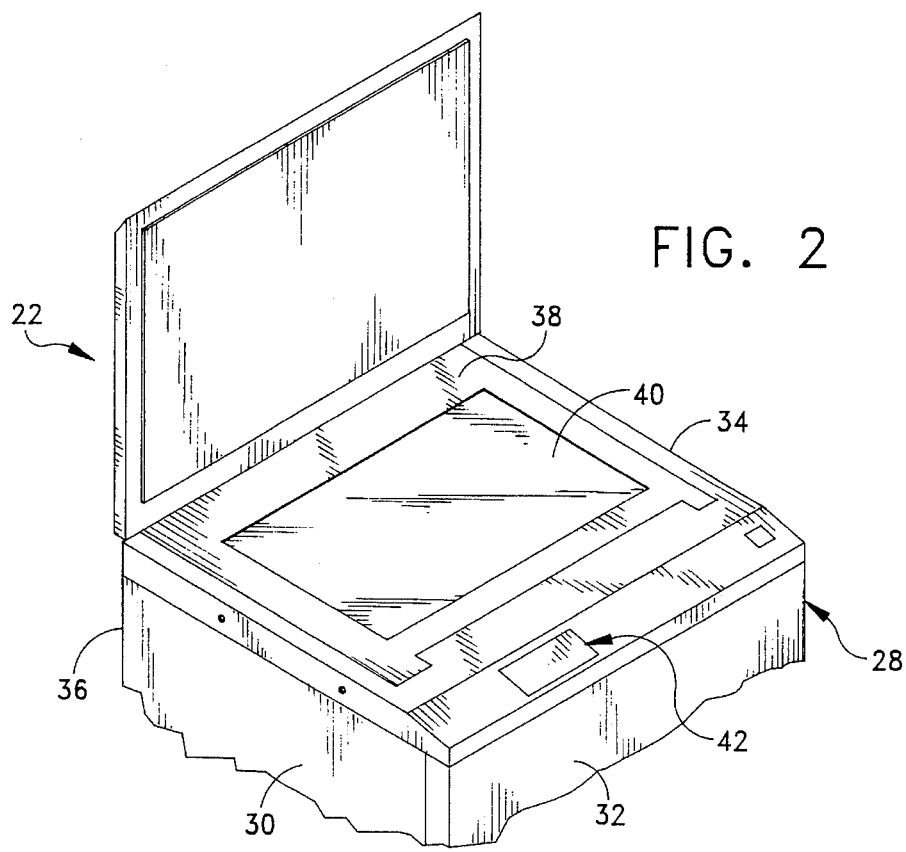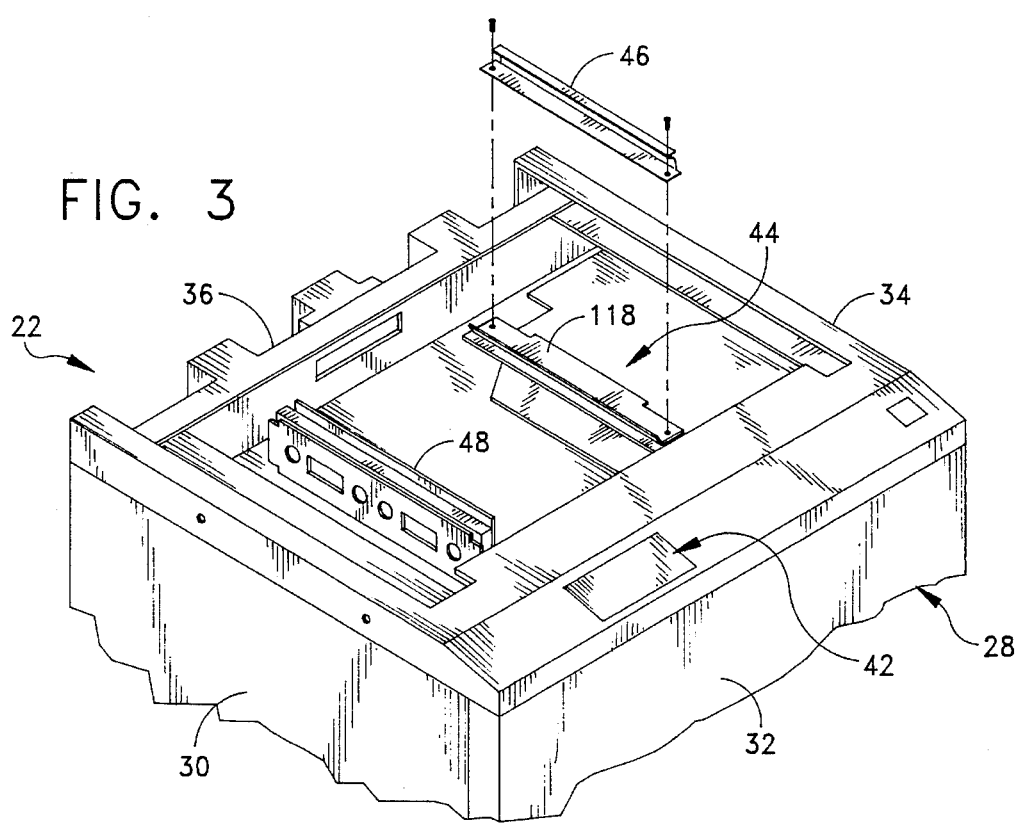

COPIER MACHINE BOOK SUPPORT STRUCTURE

BACKGROUND AND SUMMARY OF THE INVENTION

This invention relates generally to photocopier machines, and more particularly to a photocopier machine book support structure which is capable of being mounted on a new or an existing photocopier machine for making it easier to photocopy books, magazines and the like.

This invention is in the same general field as the copy machine book supports disclosed in U.S. Pat. Nos. Des. 353,830 and Des. 353,831, both to Peck, owned by the assignee of the present application. As disclosed in these patents, the supports are mounted on new or existing photocopier machines for enabling its users to more easily photocopy books, magazines or any other publications having a spine.

As shown in U.S. Pat. No. Des. 353,831, for example, the support includes a sloped surface or wall which extends away from the copying surface of the photocopier machine, the sloped surface extending along a plane which is at an angle with respect to the horizontal copy surface. A book to be copied is placed on the support in such a manner that the spine of the book extends along the junction of the sloped surface and the copying surface. The purpose of the device is to lessen the stress on the spine of the book which is normally caused by compressing the spine against the planar copying surface.

One disadvantage associated with both of these devices is that a book can be copied in only one orientation since there is only one sloped surface. Thus, the device is ill-suited for accommodating relatively tall books having a height greater than the width of the copying surface. There is presently a need for a book support structure which can accommodate relatively tall books when copying and which can give the user of the machine the option of copying in one of two orientations.

Accordingly, among the several objects of the present invention are the provision of a book support structure for a copier machine which is capable of copying pages from a book, magazine or the like in one of two orientations; the provision of such a book support structure which can accommodate and copy pages from relatively tall books; the provision of such a book support structure which can be mounted on a new or an existing photocopier machine; the provision of such a book support structure which is easy to install; and the provision of such a book support structure which is cost efficient to manufacture and install.

In general, the present invention is directed to a book support structure for a copier machine of the type comprising a generally box shaped housing having four side walls and a generally open top, means for copying articles placed above the housing, and means for controlling the copying of articles. The book support structure comprises a top, horizontally disposed planar wall constructed and arranged for receiving and supporting a sheet of glass. The top planar wall is rectangularly shaped and has four outer edges wherein the sheet of glass is positioned adjacent first and second outer edges of the top wall. A first sloping side wall has an edge integrally formed with the first edge of the top wall and extends downwardly and outwardly at an angle from the top planar wall. A second sloping side wall has an edge integrally formed with the second edge of the top wall and extends downwardly and outwardly at an angle from the top planar wall and in a direction perpendicular to the direction of the first side wall. Suitable means is provided for mounting the book support structure on the housing of the photocopier in a position in which it overlies the open top of the housing. The arrangement is such that the book support structure enables a person to copy a page of a book having a spine in two separate orientations, the first orientation being achieved by placing the spine of the book along the junction of the edge of the first side wall and the first edge of the top wall and a page of the book to be copied over the sheet of glass, and the second orientation being achieved by placing the spine of the book along the junction of the edge of the second side wall and the second edge of the top wall and a page of the book to be copied over the sheet of glass. The second orientation orients the book perpendicularly with respect to the first orientation.

In another aspect of the present invention a retrofit kit for mounting the book support structure on an existing photocopier machine is further provided. The retrofit kit comprises the aforementioned book support structure, and means for correcting the focal point of the copying means since the sheet of glass of the retrofit kit is spaced above the sheet of glass of the original top wall. The focal point correcting means comprises a replacement main reflector which replaces a main reflector of the copying means, and a replacement mirror which is mounted on a mirror of the copying means. The replacement main reflector has a focal point, disposed along an axis above the focal point axis of the main reflector.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 2 is a perspective view illustrating an existing photocopier machine on which the book support structure of the present invention is mounted;

FIG. 3 is a view similar to FIG. 2 but with the top panel, cover and reflector of the photocopier machine removed therefrom;

Corresponding reference numerals designate corresponding parts throughout the several views of the drawings.

DETAILED DESCRIPTION OF THE PREFERRED EMBODIMENT

Figure 1:
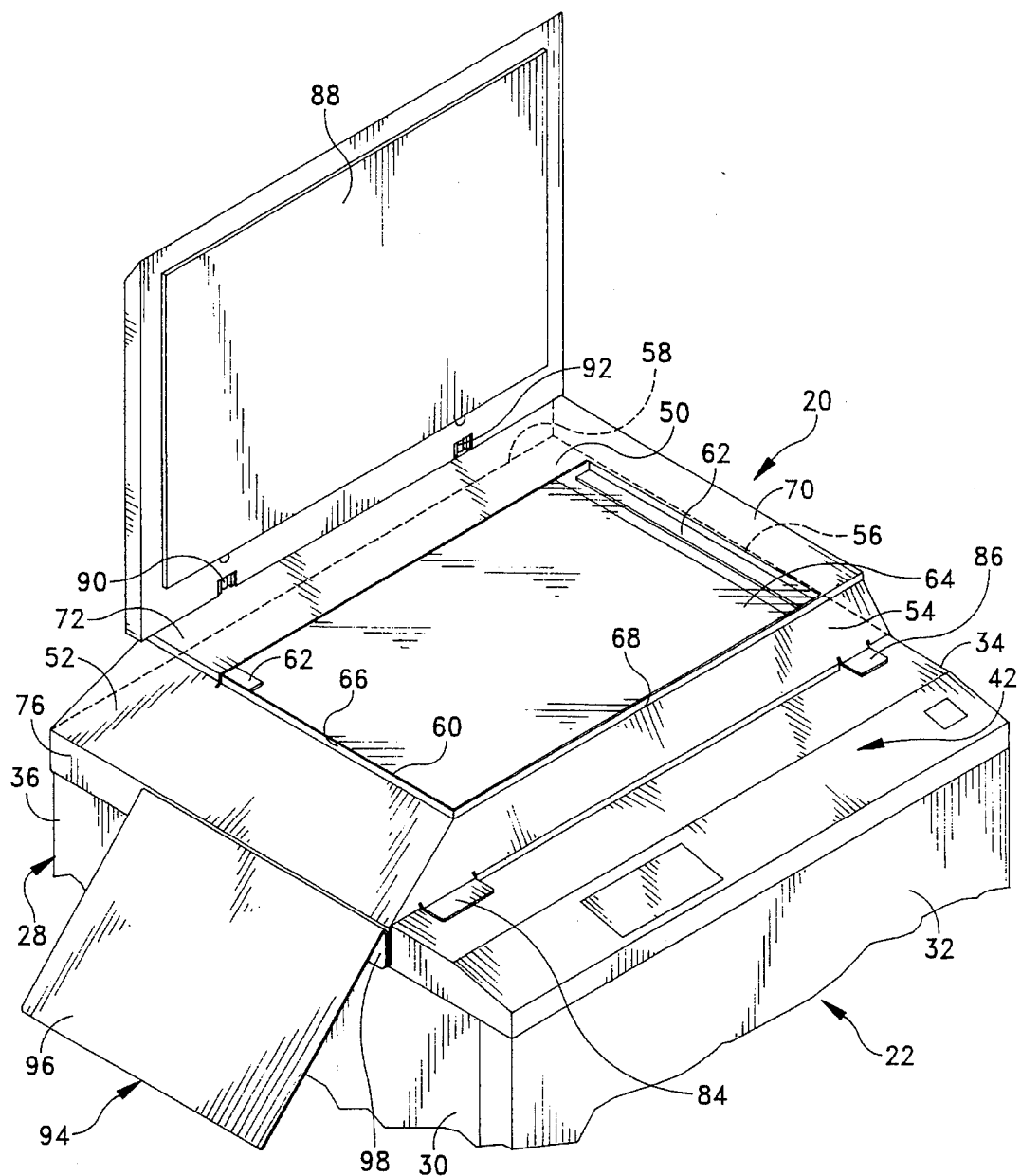
FIG. 1 is a perspective view of a photocopier machine book support structure of the present invention shown mounted on a photocopier machine.

Referring now to the drawings, and more particularly FIG. 1, there is generally indicated at 20 a book support structure of the present invention as it is mounted on a photocopier machine, generally indicated at 22. The photocopier machine 22 may be of the type specifically designed to receive the book support structure 20, or may be an existing machine which can be retrofitted to receive the book support structure 20. The book support structure 20 of the present invention as illustrated is designed for installation on Sharp (trademark of Sharp Corporation) brand photocopier machines, model nos. 2022, 2027 and 2035. However, it should be understood that by making minor modifications to the illustrated embodiment, the book support structure 20 can be mounted on other brands and models of copier machines as well. The main purpose of the book support structure 20 is for supporting books (e.g., the books generally indicated at 24 and illustrated in FIGS. 9 and 10) and preventing damage thereto. This aspect of the present invention will be discussed in greater detail below.

Turning now to FIGS. 2 and 3, there is illustrated the photocopier machine 22 prior to the mounting of the book support structure 20 thereon. As shown, the photocopier machine 22 comprises a box-shaped housing generally indicated at 28 having a bottom (not shown), four side walls 30, 32, 34 and 36, and a top horizontal panel 38 which is constructed and arranged for supporting a rectangular sheet of glass 40 in the conventional manner. Located in front of the top panel 38 is a control panel, generally indicated at 42, of typical design for controlling the copying process. Underneath the sheet of glass 40 is a suitable copying mechanism generally indicated at 44 (FIG. 3), for copying articles placed above the sheet of glass. Among a plurality of component parts embodying the copying mechanism 44 (sometimes broadly referred to as "copying means") are a main reflector 46 which houses a copy lamp (not shown) and a mirror 48 which reflects the copied image taken from the main reflector 46 to a dark box cover (not shown) located below the main reflector 46. Such copying mechanisms are well-known to those skilled in the art of photocopier machines. The arrangement is such that a person operating the copier machine 22 can control, for example, the number of copies to be made, the paper selected for copying, and/or the collation of copies by means of the control panel 42 wherein the copying mechanism 44 performs the function of imaging the article placed on the sheet of glass 40 onto a sheet of paper.

Turning back to FIG. 1, the book support structure 20 comprises a top, horizontally disposed planar wall 50, first and second downwardly sloping side walls 52, 54 and third and fourth sides walls 56, 58. Preferably, the book support structure is fabricated from rigid, sheet metal material. The top wall 50 has an opening formed therein at 60 and a pair of horizontally disposed ledges each indicated at 62 mounted on the top wall 50 (e.g., by welding) at opposite sides of the opening 60 for supporting a sheet of glass 64. Articles to be copied are disposed on the sheet of glass 64 wherein the copying mechanism 44 copies the article placed on the sheet. Again, this arrangement is well-known in the art. The top wall 50 is rectangularly shaped and has four outer edges 66, 68, 70 and 72 defining its periphery. The sheet of glass is positioned adjacent the first and second edges 66, 68 of the top wall 50 in which the second outer edge 68 extends in a direction perpendicular to the first outer edge 66.

The first sloping side wall 52 of the book support structure 20 has an edge integrally formed with the first edge 66 of the top wall 50. As shown, the first side wall 52 extends downwardly and outwardly at an angle (preferably around thirty degrees) from the top wall 50. Similarly, the second sloping side wall 54 has an edge integrally formed with the second edge 68 of the top wall 50 and extends downwardly and outwardly at an angle (preferably around forty-five degrees) from the top wall 50. The second sloping side wall 54 extends in a direction perpendicular to the direction of the first Side wall 52. The third and fourth side walls 56, 58 also extend downwardly and outwardly at an angle from the top wall 50, however, their relative angles are steeper than those of the first and second side walls 52, 54.

Figure 8:
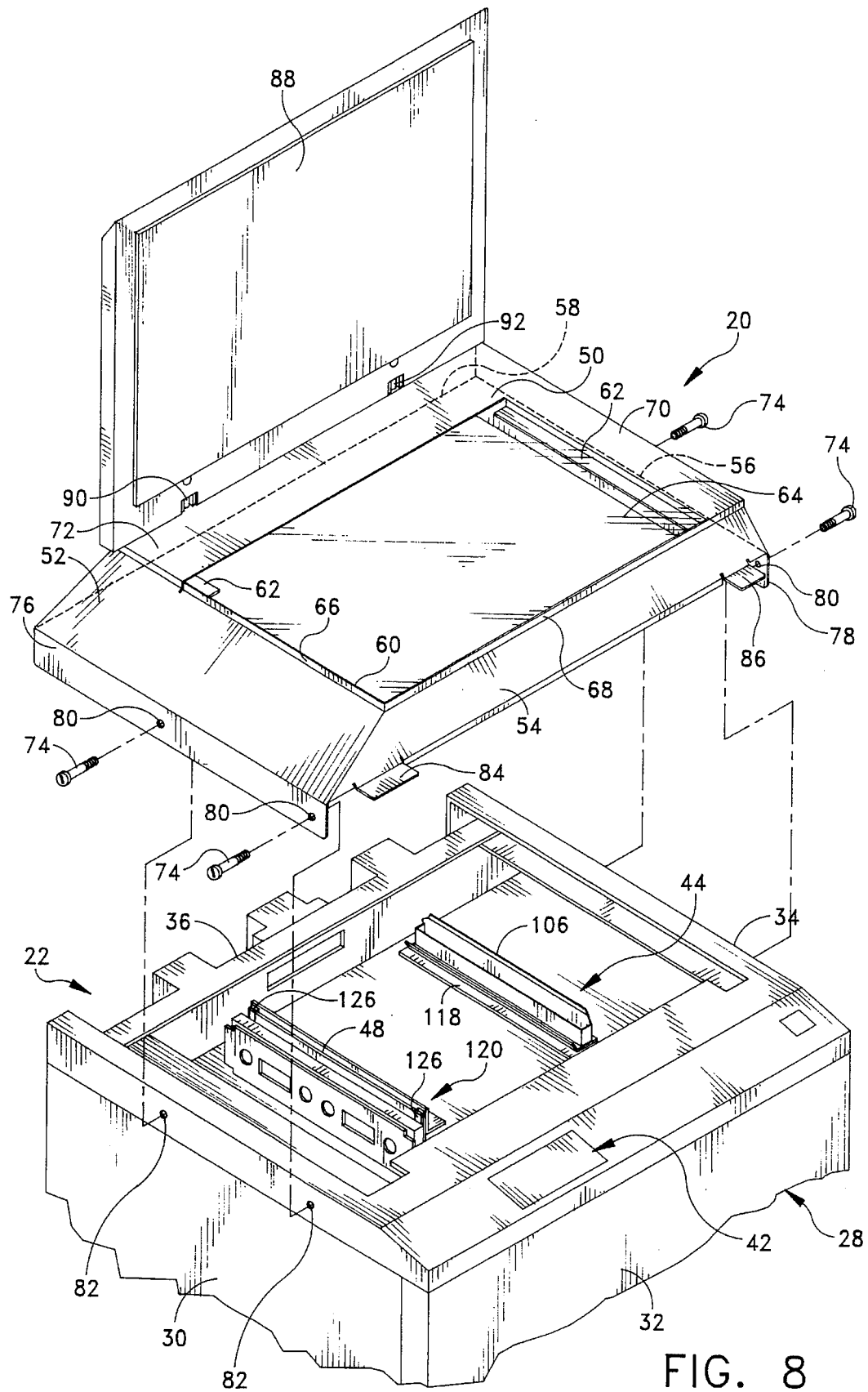
FIG. 8 is a perspective view illustrating the book support structure in a pre-assembled position.

Referring to FIGS. 1 and 8, suitable fasteners (e.g., machine bolts 74) mount the book support structure 20 on the housing 28 of the photocopier machine 22. As shown, first and second vertical flange portions 76, 78 are provided for mounting the book support structure 20 on the housing 28 of the machine 22 wherein the first flange portion 76 extends downwardly from an edge of the first side wall 52 opposite the edge adjacent the first edge 66 of the top wall 50, and the second flange portion 78 extends downwardly from a lower edge of the third side wall 56. The first and second flange portions 76, 78 are formed integrally with respective side walls 52, 56 of the structure 20. When the book support structure 20 is mounted on the housing 28 of the photocopier machine 22, the first and second flange portions 76, 78 are positioned proximate to opposite side walls 30, 34 of the housing and have openings 80 which receive the fasteners 74 therethrough for mounting the structure 20 on the housing 28. Thus, lateral stability is provided since the flange portions 76, 78 bear against respective side walls 30, 34 of the housing 28 for preventing any side-to-side movement of the structure 20 with respect to the housing 28.

It should be noted at this point that with existing photocopier machines for which the book support structure 20 of the present invention is designed, there are threaded openings 82 (FIG. 8) already formed in the side walls 30, 34 of the housing for receiving the fasteners 74. One of the primary advantages of the present invention is that the book support structure 20 can be retrofitted onto existing copier machines without having to deface the machine. This aspect of the invention will be discussed in greater detail below.

Also provided are a pair of stabilizing tabs 84, 86 which extend forwardly and outwardly along a horizontal plane from the lower edge margin of the second side wall 54. When the structure 20 is mounted on the housing 28, the stabilizing tabs 84, 86 bear against the control panel 42 of the copier machine 22 and provide stability for the structure 20 along a horizontal plane. The flange portions 76, 78 and the tabs 84, 86 enable the book support structure 20 to rest securely on the housing 28 of the photocopier machine 22.

The book support structure 20 further comprises a movable cover panel 88 which is pivotally attached to the top wall 50 adjacent the fourth (back) edge 72 thereof. The cover panel 88 is pivotally movable between an open position in which the cover panel 88 is at an angle with respect to the top wall 50 and a closed position in which the cover panel 88 overlies the top wall 50 and completely blocks the sheet of glass 64 for preventing light from touching the glass when photocopying. Although not illustrated, the cover panel 88 is capable of assuming different elevations for accommodating books having various thicknesses. This is accomplished by two pin members 90, 92 which are attached to the cover panel 88 and are received within openings (not shown) in the top wall 50 of the structure 20. This construction allows the cover panel 88 to elevate and pivot when a book 24 having a substantial thickness is placed on the sheet of glass 64 for copying.

Still referring to FIG. 1, an extension panel, generally indicated at 94, is further provided for extending the length of the first side wall 52. As shown, the extension panel 94 comprises an extension portion 96 which extends along the same plane as the first side wall 52, and a vertical mounting portion 98 with openings (not designated) formed therein which are aligned with and correspond to the openings 80, 82 in the first flange portion 76 and side wall 30 of the housing 28, respectively. As mentioned above, the extension panel extends the length of the first side wall so that larger books can be supported by the book support structure when utilizing the first side wall.

Figure 9:
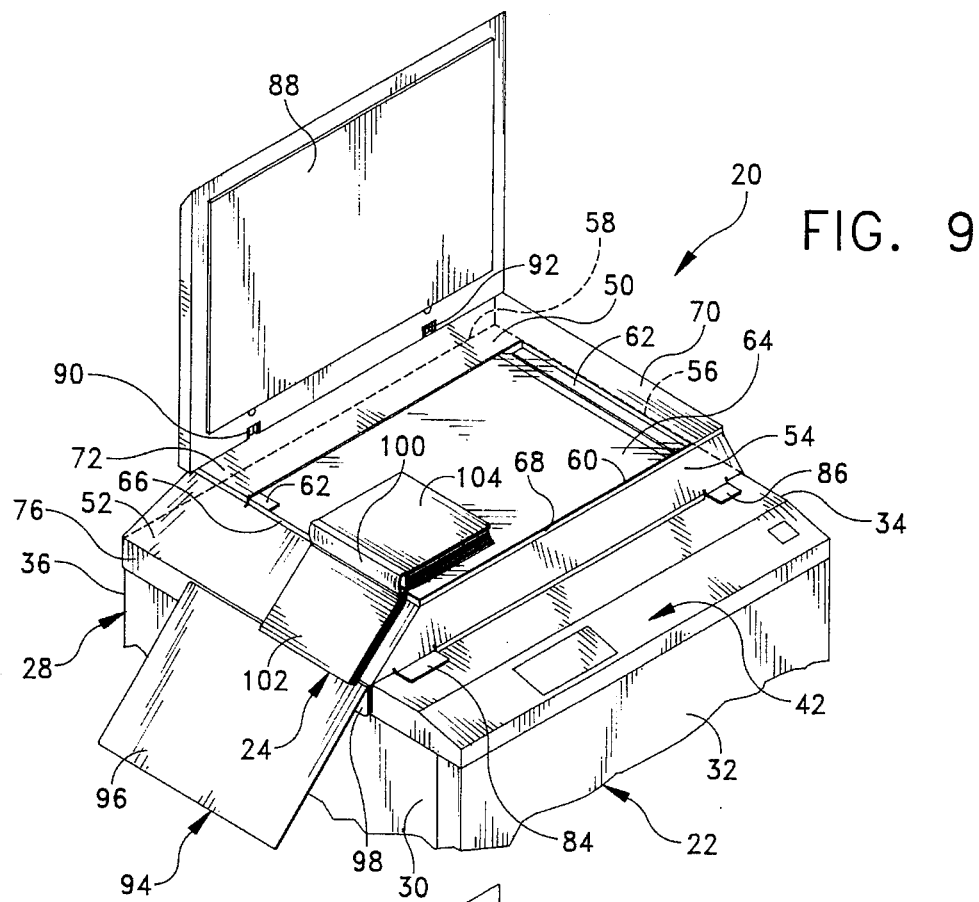
FIG. 9 is a perspective view illustrating a book having pages to be copied disposed on the book support structure in a first orientation.
Figure 10:
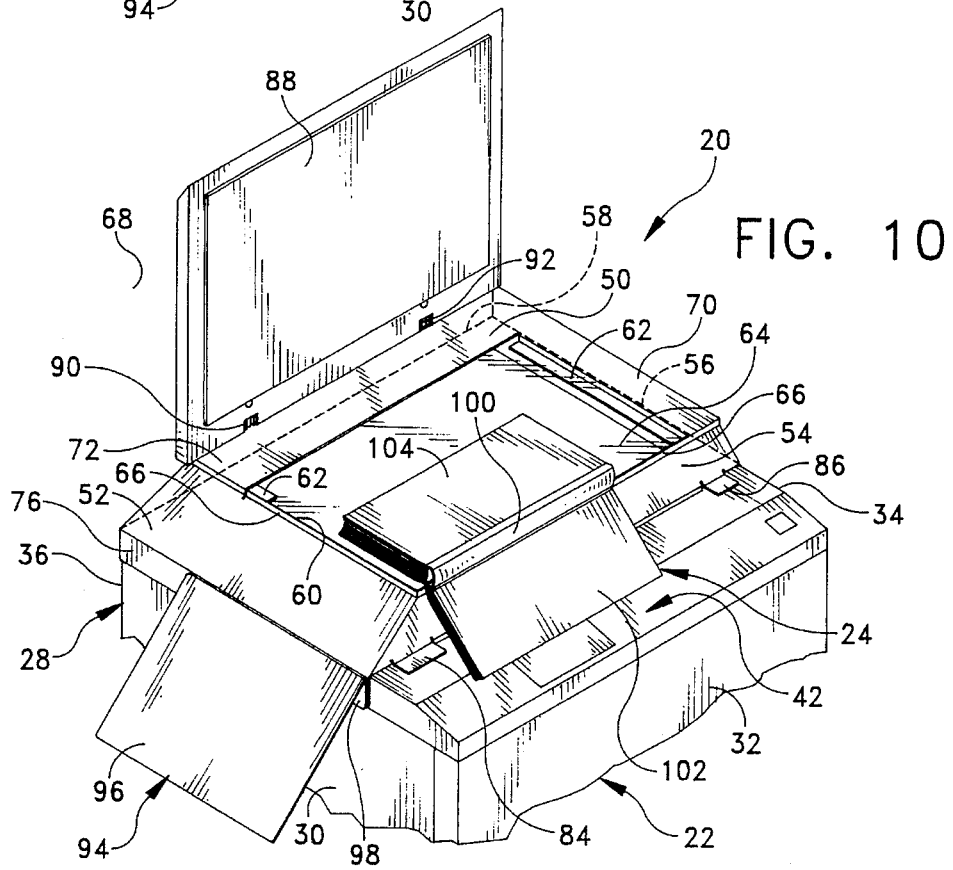
FIG. 10 is a perspective view illustrating a book disposed on the book support structure in a second orientation.

Turning now to FIGS. 9 and 10, the operation of the book support structure 20 will now be described. The structure 20 enables a person to copy a page of a book 24 and/or other similar article having a spine 100 in two separate orientations. As illustrated in FIG. 9, in a first orientation, the spine 100 of the book 24 is placed along the junction of the edge of the first side wall 52 and the first edge 66 of the top wall 50, and a page of the book 24 to be copied is disposed over the sheet of glass 64. The extension panel 94 enables the book support structure 20 to accommodate books having relatively large widths. It should be noted that the cover panels 102, 104 of the book 24 are at a desired angle of separation which prevents damage to the book's spine 100 since the cover panels 102,104 are not disposed on the sheet of glass 64 along a horizontal plane as would be the case with the conventional copier machine illustrated in FIG. 2. Since the sheet of glass 64 is located adjacent the junction of the first edge 66 of the top wall 50 and the edge of the first side wall 52, the whole page of the book 24 can be copied.

For books having relatively large heightwise dimensions, the book 24 can be oriented in a second orientation which is illustrated in FIG. 10. As shown, the second orientation is achieved by placing the spine 100 of the book 24 along the junction of the edge of the second side wall 54 and the second edge 68 of the top wall 50 wherein the page to be copied is placed over the sheet of glass 64. In this position, the cover panel 102 of the book 24 rests against the control panel 42 of the photocopier machine 22 and the cover panels 102, 104 are at a desired angle of separation which prevents damage to the book's spine 100. The elevation of the top wall 50 and sheet of glass 64 of the structure 20 above the control panel 42 enables the book support structure 20 to accommodate relatively tall books without having to maintain the cover panels 102, 104 of the book 24 along a horizontal plane which damages the spine 100 of the book 24.

Figure 4:
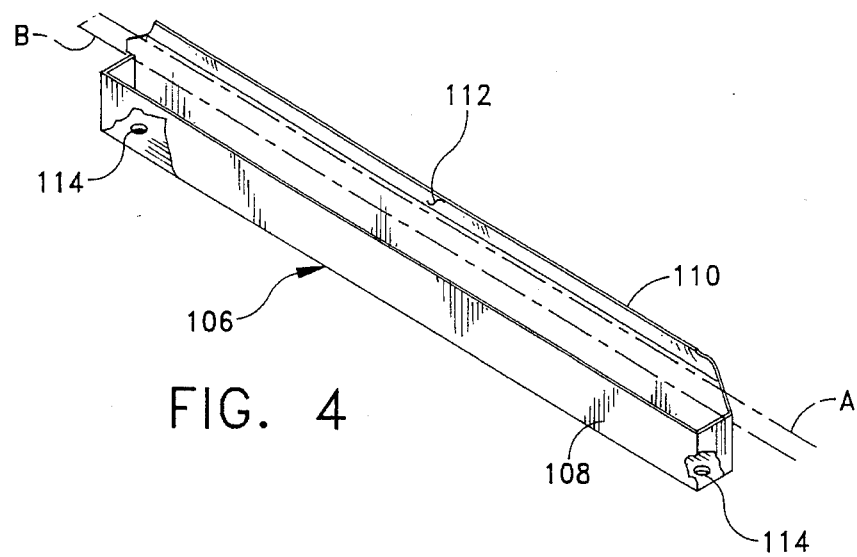
FIG. 4 is a perspective view illustrating a replacement main reflector of a copier machine book support structure retrofit kit of the present invention.
Figure 5:
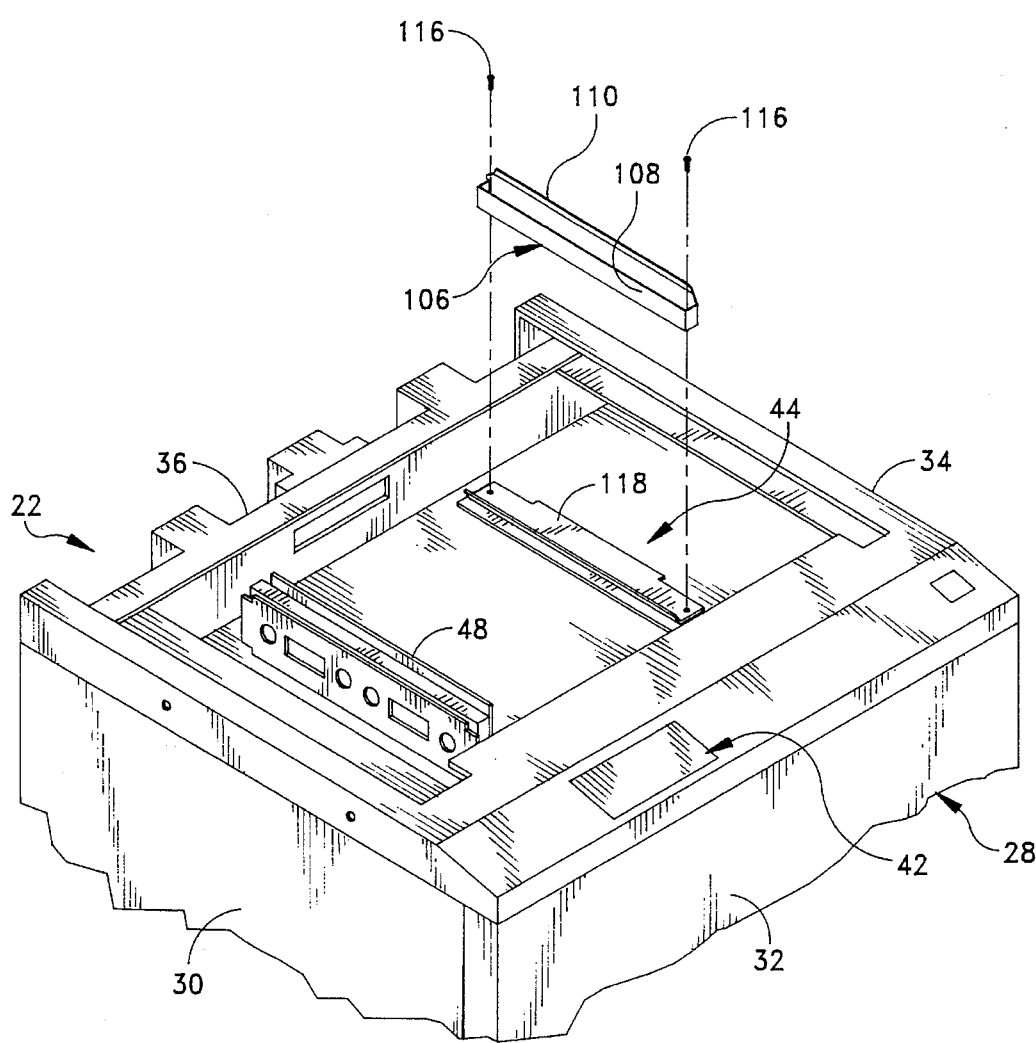
FIG. 5 is a perspective view showing the replacement main reflector in a pre-assembled position.

The procedure for retrofitting an existing copier 22 with the book support structure 20 of the present invention will now be described. The first step of the procedure is to remove the top panel 38 of the copier machine 22 as illustrated in FIG. 3. Since the book support structure 20 essentially elevates the sheet of glass of the copier machine, the focal point of the main reflector 46 must be raised, otherwise, poor copies would result. Accordingly, the main reflector 46 is removed (FIG. 3) and replaced by a replacement main reflector (FIG. 5), generally indicated at 106. As illustrated in FIG. 4, the replacement reflector 106 has a box-like housing 108 and a reflective wall 110 extending up from the housing 108. The reflective wall 110 has a curved reflective surface 112 with a focal point lying along axis A. A pair of openings 114 in the bottom of the housing 108 receive bolt fasteners 116 for mounting the replacement reflector 106 on a movable carriage 118. As shown, the focal point lying along axis A is higher than the focal point of the main reflector 46 which is represented by axis B in FIG. 4. The replacement main reflector 106 is designed for receiving and mounting thereon a copy lamp (not shown) axially along the length of the reflector 106 in a position in front of the reflective wall 110.

Figure 6A:
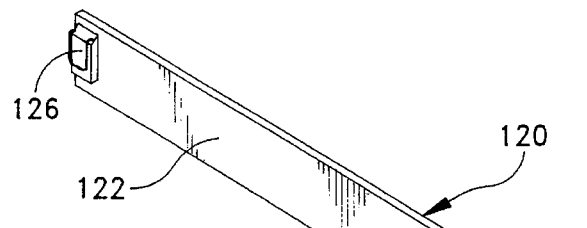
FIGS. 6A and 6B are front and rear perspective views, respectively, illustrating a replacement mirror of the retrofit kit.
Figure 6B:
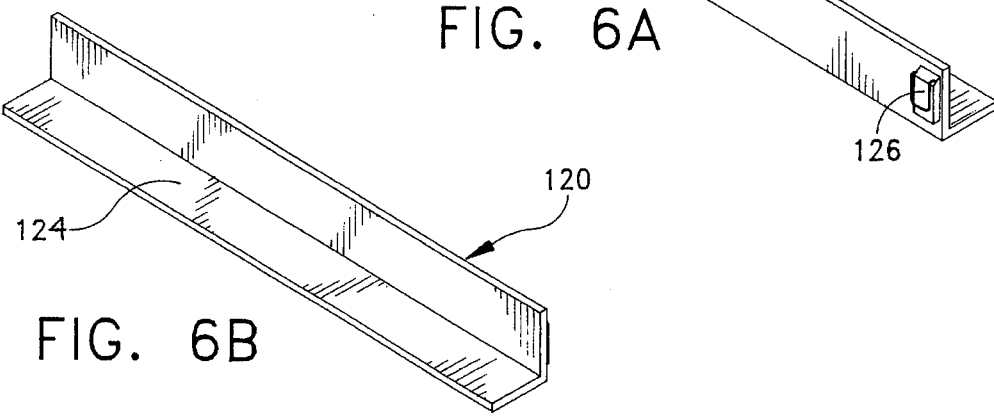
Figure 7:
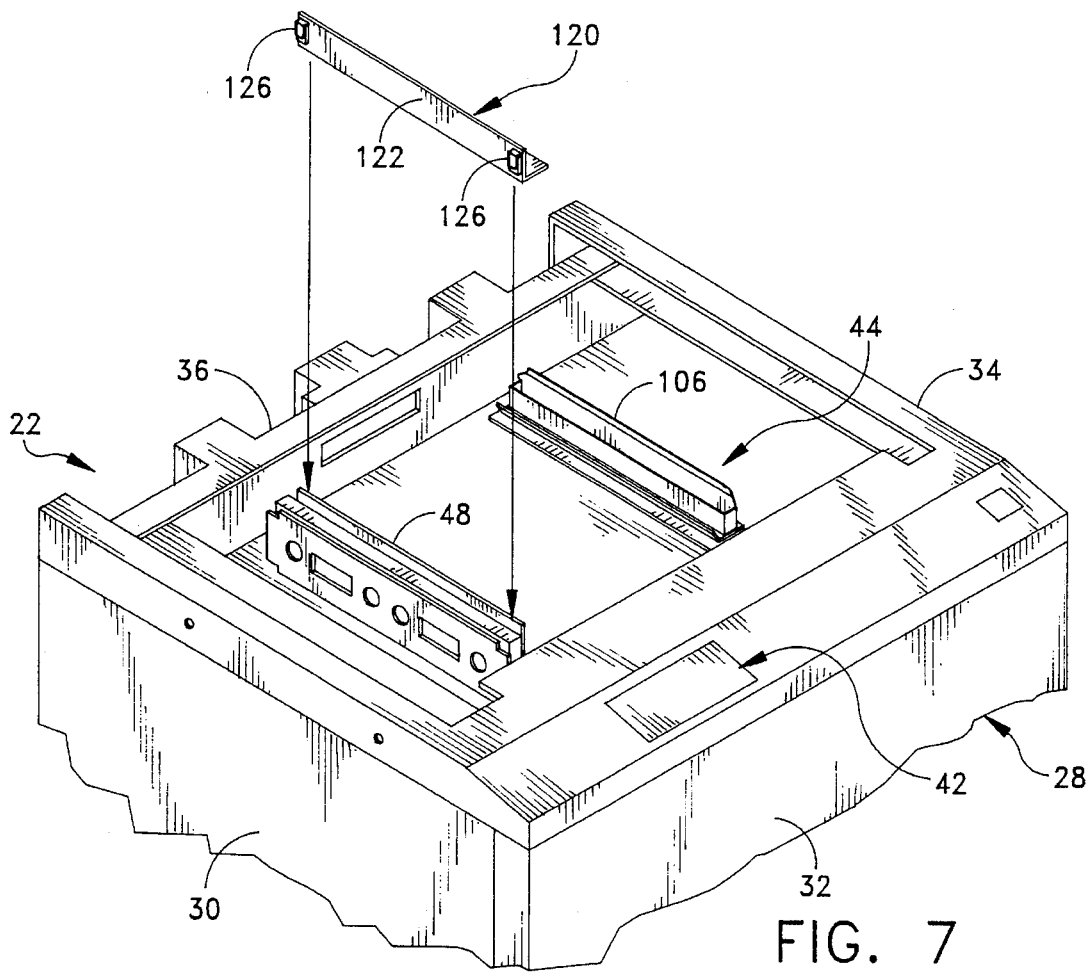
FIG. 7 is a perspective view illustrating the replacement mirror in a pre-assembled position and the replacement main reflector in an assembled position.

Referring now to FIGS. 6A, 6B and 7, there is illustrated in FIGS. 6A and 6B a replacement mirror, generally indicated at 120, which is substituted for the mirror 48 of the copying mechanism 44. More specifically, the replacement mirror 120 includes an L-shaped body portion 122 having a reflective surface 124 and a pair of resilient mounting clips each indicated at 126 attached to the back of the body portion 122. The arrangement is such that the replacement mirror 120 clamps onto the mirror 48 by means of clips 126 for securing the replacement mirror 120 in place. The replacement mirror 120 is constructed and arranged for reflecting images from the reflective surface 112 of the replacement main reflector 106 towards the dark box cover (not shown) located below the replacement main reflector 106. In other words, the replacement mirror 120 is designed for the higher focal point of the replacement main reflector 106. FIGS. 7 and 8 illustrate the manner in which the replacement mirror 120 is mounted on the mirror 48.

It should be noted at this point that the dark box cover, which receives the reflected images taken from the replacement main reflector 106 and replacement mirror 120, can be modified so that a focused image on a sheet of paper results. It is to be understood that a person skilled in the art of photocopier machines can make the minor adjustments and other Changes necessary to achieve an accurate and focused copy.

Next, the book support structure 20 is mounted on the copier machine housing 28 in the manner illustrated in FIG. 8. The structure 20 is lowered onto the housing 28 in a position where the flange portions 76, 78 are adjacent respective side walls 30, 34 of the housing 28 and the tabs 84, 86 extend over the control panel 42. Bolt fasteners 74 mount the book support structure 20 in place wherein the extension panel 94 may or may not be included depending upon the requirements of the user of the copier machine 22. At this point the copier machine 22 is ready for use in which books 24 having spines 100 can be copied in one of the two aforementioned orientations.

It should be observed that the book support structure 20 of the present invention can be easily retrofitted onto an existing copier machine without having to deface or damage the machine. It should also be noted that the structure 20 can receive books 24 to be copied in one of two orientations, and is particularly suited for copying pages from tall books.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A book support structure for a copier machine of the type comprising a generally box-shaped housing having four side walls and a generally open top, means for copying articles placed above said housing, and means for controlling the copying of articles, said book support structure comprising:

a top, horizontally disposed planar wall constructed and arranged for receiving and supporting a sheet of glass, said top planar wall being rectangularly-shaped and having four outer edges, said sheet of glass being adjacent first and second outer edges of the top wall, said second outer edge extending in a direction perpendicular to the first outer edge;

a first sloping side wall having an edge integrally formed with the first edge of the top wall, said first side wall extending downwardly and outwardly at an angle from said top planar wall;

a second sloping side wall having an edge integrally formed with the second edge of the top wall, said second side wall extending downwardly and outwardly at an angle from said top planar wall and in a direction perpendicular to the direction of the first side wall; and means for mounting said book support structure on said housing of the photocopier in a position in which it overlies the open top of the housing, wherein the arrangement is such that the book support structure enables a person to copy a page of a book having a spine in two separate orientations, the first orientation being achieved by placing the spine of the book along the junction of the edge of the first side wall and the first edge of the top wall and a page of the book to be copied over the sheet of glass, and the second orientation being achieved by placing the spine of the book along the junction of the edge of the second side wall and the second edge of the top wall and a page of the book to be copied over the sheet of glass, said second orientation orienting the book perpendicularly with respect to the first orientation.

2. A book support structure as set forth in claim 1 further comprising a movable cover panel pivotally attached to the top wall, said cover panel being pivotally movable between an open position in which the cover panel is at an angle with respect to the top wall and a closed position in which the cover panel overlies the top wall and blocks the sheet of glass.

3. A book support structure as set forth in claim 1, said mounting means comprising a first vertical flange portion extending downwardly from an edge of the first side wall opposite said edge adjacent the first edge of the top wall, and a second vertical flange portion extending downwardly from an edge of the top wall opposite said first edge, said first and second flange portions being positioned proximate to opposite side walls of the copier machine and having openings which receive fastening elements therethrough for mounting the book support structure on the housing of the copier machine.

4. A book support structure as set forth in claim 3, said mounting means further comprising at least one stabilizing tab which extends outwardly along a horizontal plane from the lower edge margin of the second side wall.

5. A book support structure as set forth in claim 3 further comprising an extension panel having a vertical mounting portion with openings aligned with and corresponding to the openings in the first flange portion and an extension portion extending along the plane of said first side wall for extending the first side wall so that larger books may be supported by the book support structure.

6. A retrofit kit for a copier machine of the type comprising a generally box-shaped housing having four side walls and a top horizontal panel constructed and arranged for supporting a sheet of glass, means for copying articles placed on the top horizontal panel above said sheet of glass, and means for controlling the copying of articles, said retrofit kit comprising a book support structure being adapted to replace the top horizontal panel of the copier machine for orienting a book having a spine in one of two copying positions, said book support structure comprising:

a top, horizontally disposed planar wall constructed and arranged for receiving and supporting a sheet of glass, said top planar wall being rectangularly shaped and having four outer edges, said sheet of glass being adjacent first and second outer edges of the top wall, said second outer edge extending in a direction perpendicular to the first outer edge;

a first sloping side wall having an edge integrally formed with the first edge of the top wall, said first side wall extending downwardly and outwardly at an angle from said top wall;

a second sloping side wall having an edge integrally formed with the second edge of the top wall, said second side wall extending downwardly and outwardly at an angle from said top wall and in a direction perpendicular to the direction of the first side wall; and means for mounting said book support structure on said housing of the copier machine, after said top horizontal panel of the copier machine has been removed, in a position in which it overlies an open top of the housing, wherein the arrangement is such that the book support structure enables a person to copy a page of a book having a spine in two separate orientations, the first orientation being achieved by placing the spine of the book along the junction of the edge of the first side wall and the first edge of the top wall and a page of the book to be copied over the sheet of glass, and the second orientation being achieved by placing the spine of the book along the junction of the edge of the second side wall and the second edge of the top wall and a page of the book to be copied over the sheet of glass, said second orientation orienting the book perpendicularly with respect to the first orientation.

7. A retrofit kit as set forth in claim 6, said book support structure further comprising a movable cover panel pivotally attached to the top wall, said cover panel being pivotally movable between an open position in which the cover panel is at an angle with respect to the top wall and a closed position in which the cover panel overlies the top wall and blocks the sheet of glass.

8. A retrofit kit as set forth in claim 6, said mounting means of the book support structure comprising a first vertical flange portion extending down from an edge of the first side wall opposite said edge adjacent the first edge of the top wall, and a second vertical flange portion extending downwardly from an edge of the top wall opposite said first edge, said first and second flange portions being positioned proximate to opposite side walls of the copier machine and having openings which receive fastening elements therethrough for mounting the book support structure on the housing of the copier machine.

9. A retrofit kit as set forth in claim 8, said mounting means further comprising at least one stabilizing tab which extends outwardly along a horizontal plane from the lower edge margin of the second side wall.

10. A retrofit kit as set forth in claim 8, said book support structure further comprising an extension panel having a vertical mounting portion with openings aligned with and corresponding to the openings in the first flange portion and an extension portion extending along the plane of said first side wall for extending the first side wall so that larger books may be supported by the book support structure.

11. A retrofit kit as set forth in claim 6 further comprising means for correcting the focal point of the copying means since said sheet of glass of the retrofit kit is spaced above the sheet of glass of the original top wall.

12. A retrofit kit as set forth in claim 11, said focal point correcting means comprising a replacement main reflector which replaces a main reflector of said copying means, and a replacement mirror which is mounted on a mirror of said copying means, said replacement main reflector having a focal point disposed along a linear axis above the focal point axis of the main reflector.

* * * * *